Dec. 17, 1968   R. D. TRACEY   3,416,683
DETACHABLE LOW BED TRAILER
Filed Aug. 8, 1966   2 Sheets-Sheet 1
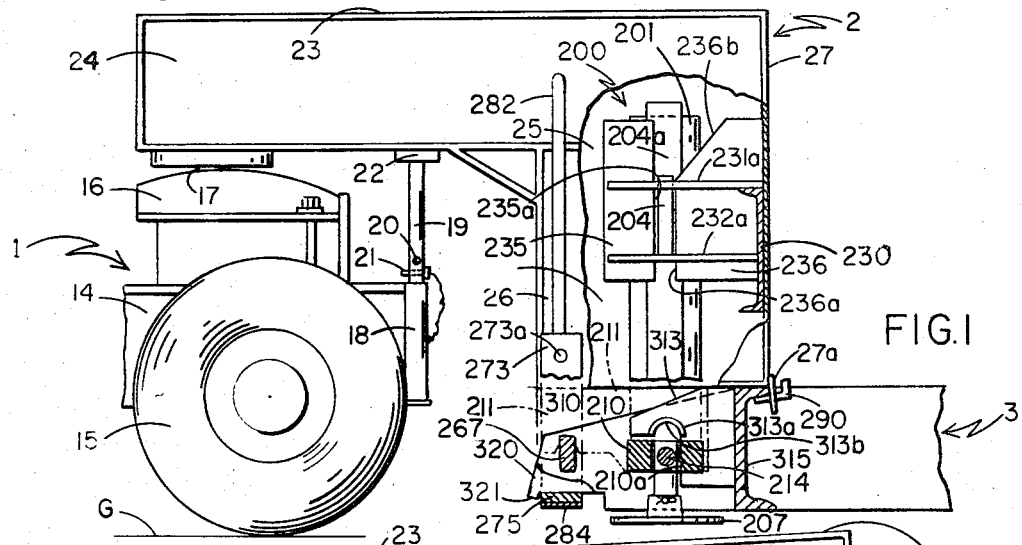
FIG. 1
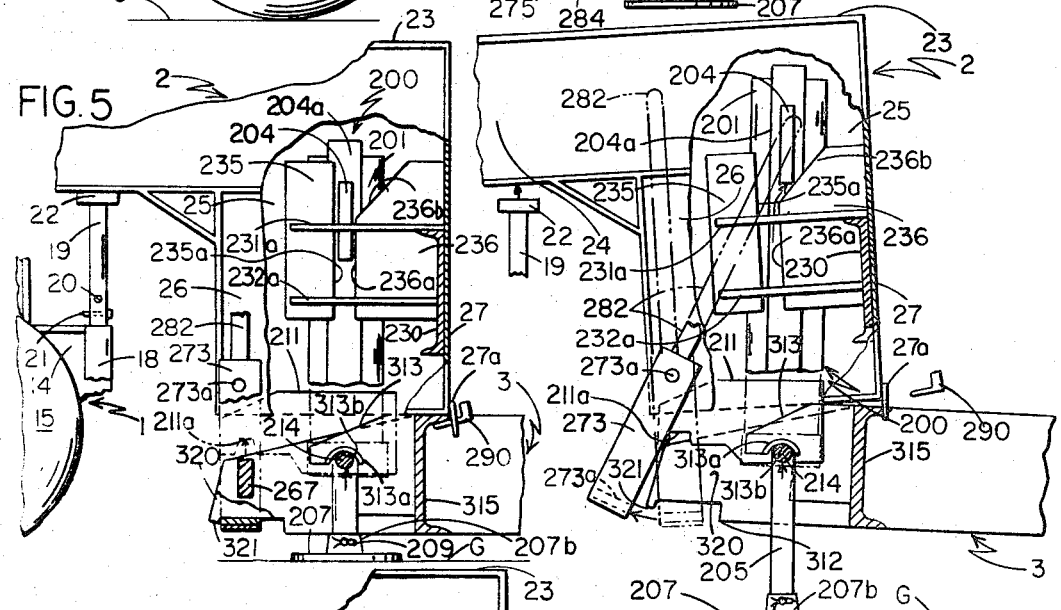
FIG. 5
FIG. 6
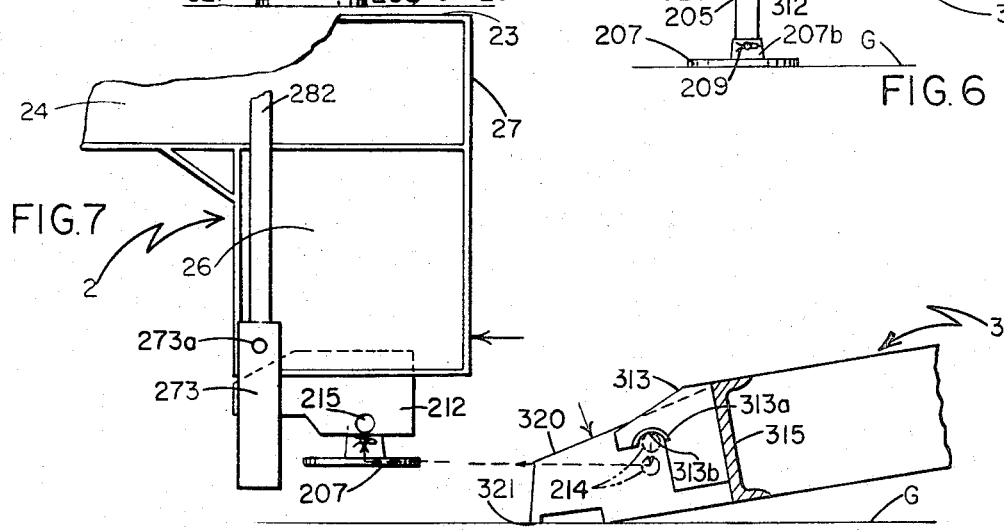
FIG. 7

Dec. 17, 1968  R. D. TRACEY  3,416,683

DETACHABLE LOW BED TRAILER

Filed Aug. 8, 1966  2 Sheets-Sheet 2

United States Patent Office 3,416,683
Patented Dec. 17, 1968

3,416,683
DETACHABLE LOW BED TRAILER
Richard D. Tracey, 5 Butler Ave.,
Lexington, Mass. 02173
Filed Aug. 8, 1966, Ser. No. 571,089
1 Claim. (Cl. 214—506)

ABSTRACT OF THE DISCLOSURE

A detachable low bed trailer of the type described in U.S. Patent 2,934,230 is described having improved flexibility for loading on uneven surfaces such as rough roads. A guiding means is provided whose lower portion is vertical and whose upper portion permits tilting of the cylinder on the engaging element of the trailer.

This invention relates to an improved, detachable low bed trailer of the type described in U.S. Patent 2,934,230.

The latter patent describes a low bed trailer having a detachable connecting frame housing an elevator assembly. The elevator assembly contains ground-engaging hydraulic jacks and is adapted to slide up and down on the frame. The frame is removably attached to the conventional fifth wheel assembly of the tractor. The elevator assembly and trailer are provided with complementary attachment means for raising and lowering, while the frame and trailer have complementary means for alignment. The frame is provided with means for locking the elevator to the trailer and supporting the trailer.

The particular attachment alignment and locking means described in said U.S. Patent 2,934,230 include an inverted horizontal transverse raising channel on the trailer which engages a lift bar attached to the hydraulic cylinders. The lift bar is arranged to move vertically in two stationary guide slides attached to the frame. A hook is provided which is lever operated and pivotable and provides a lock.

Although the arrangement described in this patent provides generally satisfactory results, it was later determined that the arrangement of the interacting elements between the frame and the trailer was not sufficiently flexible for loading on uneven surfaces such as rough roads. Upon occasion there would be binding of the mechanism and snapping or breaking of the pistons of the hydraulic jacks. In addition, manufacture and assembly of these interlocking elements was complex and costly.

The Rogers patent does not relate to a trailer elevator slideable in the trailer connecting frame. Further, the element 37 noted by the Examiner in the Rogers patent provides side guiding but not front and back guiding. The claim as amended points out that the cylinder moves with respect to the guiding means and that the upper portion is at an angle to the lower portion. None of these features are disclosed in Rogers or in any of the other references cited. Further, none of the references provide the increased flexibility of the of the present invention. It is, therefore, believed that claim 1 as amended should be allowed over all the references cited.

The expression "the engaging element of a trailer" is not itself a structural part of the invention and hence does not require a positive antecedent. However, for purposes of clarity, the claim has been amended to introduce this phrase into the preamble portion of the claim.

Accordingly, the claim as amended now avoids the rejections under 35 U.S.C. 103 and 35 U.S.C. 112.

In accordance with the requirements of the Examiner it is hereby requested that the following abstract be inserted in the appropriate place in the application:

One object of this invention is to provide a simplified, more flexible and less costly form of a detachable low bed trailer of the sliding elevator type.

Further objects and advantages of this invention will be apparent from the description which follows, the claims, and the appended drawings wherein:

FIG. 1 is a side view of a portion of the tractor with the frame and trailer shown in riding position and tube 19 in raised position to enable detaching.

Figure 2:
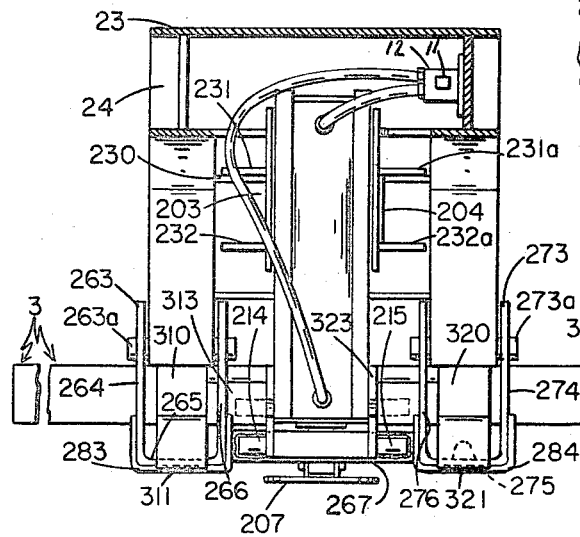
FIG. 2 is a rear view of the frame in riding position.

FIG. 2-A is an enlarged view of a portion of FIG. 2.

Figure 3:
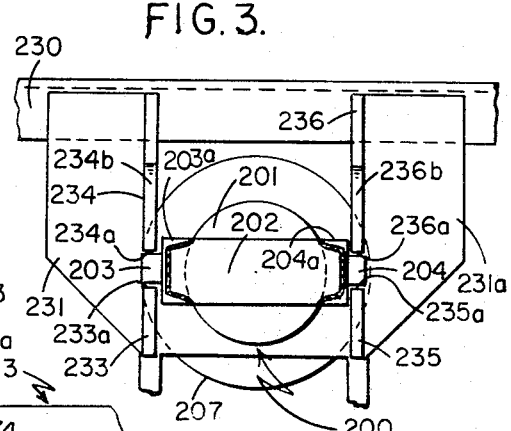
Figure 2A:
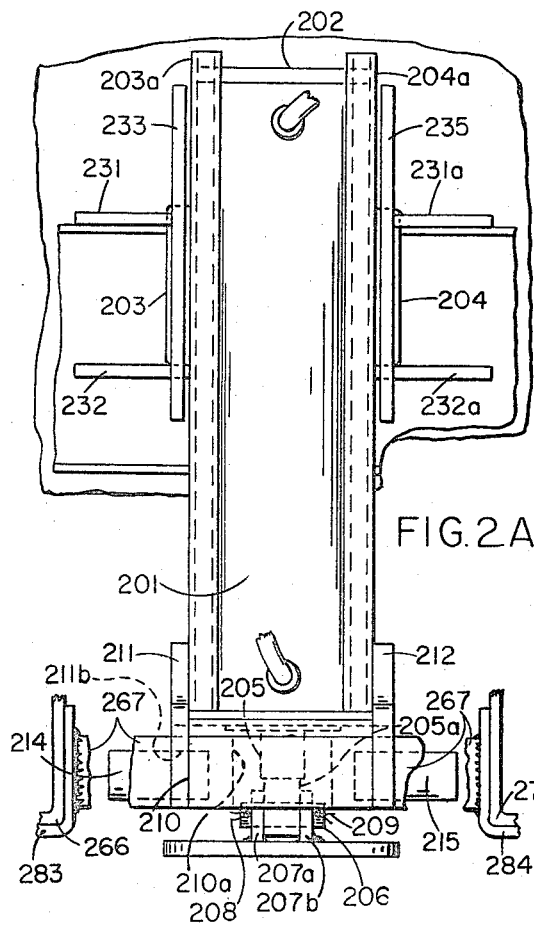

FIG. 3 is a plan view of the hydraulic jack portion.

Figure 4:
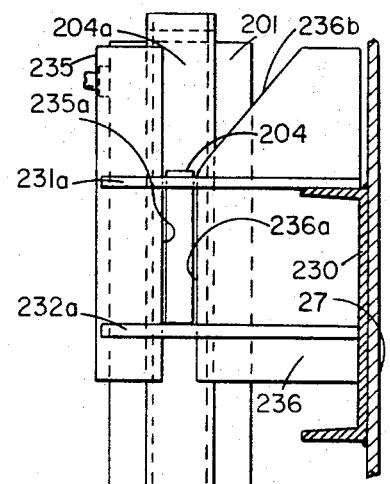
Figure 4:
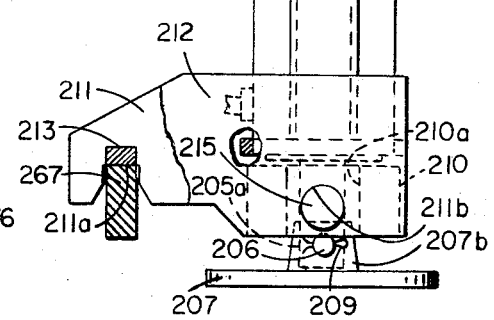

FIG. 4 is a side view of the jack in riding position.

FIG. 5 is a partial side view of the trailer and frame in position for raising, with the piston foot on the ground.

FIG. 6 is a partial side view showing the trailer raised and disconnected from the yoke, being supported by the piston.

FIG. 7 is a side view showing the trailer completely disconnected from the frame.

Referring now to the drawings, the tractor 1 is shown with the gooseneck or connecting frame 2 connected by conventional king pin elements 17 to the customary fifth wheel assembly 16. The tractor 1 is also provided with its customary rear driving wheels 15, a base 14 which supports the fifth wheel assembly 16 as well as a housing 18 in which there is spaced an extendable tube 19 having a support portion 22. This tube 19 is held in extended upward position by insertion of a pin 21 through hole 20 resting on the end of housing 18.

The connecting frame 2 has an upper portion 23, left and right vertical walls 25 and 26, and a rear wall 27.

The hydraulic jack assembly 200 comprises a main cylinder 201, to which is attached a cross piece 202. At each end of the cross piece 202 are projections 203 and 204 which are adapted to move in the channels formed by plates 235 and 236 on one side, and plates 233 and 234 on the other side. Plates 233 and 235 have vertical guide surfaces, while plates 234 and 236 have the upper portion of their guide surfaces directed angularly outward as shown in 236b.

Also associated and connected to the clinder 201 is a block 210. Block 210 has a central hole 210a through which the piston rod 205 is free to move. Piston rod 205 terminates in a foot 207 pivotally held on the rod 205 by a pin 206 with cotter pins 208 and 209. At each end of the block 210 are pivot lift pins 214 and 215. These lift pins 214 and 215 are engagable, as explained below, with the recesses 313a and 323b of the projections 313 and 323 of the trailer 3.

It is thus apparent, that after the piston rod 205 with its foot 207 engages the ground, further application of hydraulic pressure will cause the cylinder 201 and its appurtenances to rise. In doing so this cylinder will be guided by the motion of the projections 203 and 204 in the channels. While the channels are vertical, the lift pins 214 and 215 are enabled to engage the trailer projection recesses 313a and 323b. After engagement the upper channels permit tilting of the cylinder and piston without disengaging.

Attached to the gooseneck of frame 2 are two pivotable yokes 263 and 273, which are adapted to have their bottom or support portions engageable with the lips 311 and 321 of the trailer projections 310 and 320. On the rear wall 27 is a central plate 27a which has an orifice through which a locking pin 290 can be inserted to fit tightly across the upper portion of the cross beam 315 on the front of the trailer. Locking pin 290 is used to hold the gooseneck in place on the trailer when the tractor is disconnected.

To attach a loaded trailer to a gooseneck already mounted on a tractor, the sequence is as follows. The operator presses on button 11 which actuates valve 12. This causes hydraulic fluid to go to the top of cylinder 201, acting on the piston to cause piston rod 205 to go outward. Foot 207 is thus caused to strike the ground. At this point the continued hydraulic pressure causes the cylinder 201 with its appurtenances to rise. As the cylinder rises it moves along guide plates 234–236 in a vertical direction while the lift rods 214 and 215 engage the recesses 313*a* and 323*a*. When the projections reach the cam surfaces 234*b* and 236*b* the whole cylinder assembly is permitted to tilt as occasioned by the terrain. The vertical track permits proper engagement of recess and lift rods while the upper cam surfaces permit the freedom to tilt or adjust to prevent binding or breaking of the piston rod.

I claim:

1. In the combination of (a) a trailer connecting frame adapted for attachment to the fifth wheel of a tractor and (b) a trailer elevator slideable in said frame and comprising a two-way power cylinder and ground-engaging piston rod, a trailer lift element being attached to the cylinder and adapted for engagement with the engaging element of a trailer, the improvement comprising: means in said frame for guiding said lift element, the lower portion of said means being vertical and of sufficient height to permit engagement of said lift element with the engaging element of a trailer, the upper portion of said means being angular with respect to said lower portion permitting tilting of said cylinder and piston on said engaging element; said cylinder being movable with respect to said means.

References Cited

UNITED STATES PATENTS

| 2,590,181 | 3/1952 | Keesler | 280—425 |
| 2,590,210 | 3/1952 | Rogers | 280—425 |
| 2,844,265 | 7/1958 | Clark | 280—423 |
| 2,895,746 | 7/1959 | Swaney | 280—423 |

FOREIGN PATENTS 1,322,949   2/1963   France.

ALBERT J. MAKAY, *Primary Examiner.*

U.S. Cl. X.R.

280—425